United States Patent [19]

Holder et al.

[11] Patent Number: 5,577,150
[45] Date of Patent: Nov. 19, 1996

[54] METHOD AND TOOL FOR ACCESSING OPTICAL FIBERS WITHIN A BUFFER TUBE

[75] Inventors: James D. Holder; Jeffrey S. Barker, both of Hickory, N.C.

[73] Assignee: Alcatel NA Cable Systems, Inc., Claremont, N.C.

[21] Appl. No.: 540,889

[22] Filed: Oct. 11, 1995

[51] Int. Cl.⁶ .............................. G02B 6/00; G02B 6/36
[52] U.S. Cl. ............................ 385/134; 30/90.4; 81/9.51
[58] Field of Search .................................. 385/134, 135, 385/136, 147; 30/90.1, 90.2, 90.3, 90.4, 90.6, 90.8; 81/9.4, 9.51; 225/96, 96.5, 2, 101

[56] References Cited

U.S. PATENT DOCUMENTS

| | | | |
|---|---|---|---|
| 2,120,398 | 6/1938 | Edwards et al. | 30/90.8 |
| 2,662,283 | 12/1953 | Gienger | 30/90.8 |
| 3,112,277 | 12/1963 | Clendenin | 30/90.8 |
| 3,375,579 | 4/1968 | Slonksnes | 30/90.8 |
| 4,046,298 | 9/1977 | Schroeder | 81/9.51 |
| 4,356,630 | 11/1982 | David | 30/90.4 |
| 4,434,554 | 3/1984 | Korbelak | 30/90.8 |
| 4,463,494 | 8/1984 | Bianco, Jr. | 30/90.4 |
| 4,569,129 | 2/1986 | Higgins | 30/90.4 |
| 4,615,116 | 10/1986 | Hanson et al. | 30/90.4 |
| 4,619,387 | 10/1986 | Shank et al. | 225/96.5 |
| 4,621,754 | 11/1986 | Long et al. | 225/96.5 |
| 4,640,009 | 2/1987 | Liversidge | 30/90.1 |
| 4,665,616 | 5/1987 | Orecchio | 30/90.4 |
| 4,741,104 | 5/1988 | Noon | 30/90.4 |
| 4,852,244 | 8/1989 | Lukas | 81/9.51 |
| 4,947,549 | 8/1990 | Genovese et al. | 30/90.8 |
| 4,969,703 | 11/1990 | Fyfe et al. | 385/123 |
| 4,972,581 | 11/1990 | McCollum et al. | 30/90.1 |
| 5,050,302 | 9/1991 | Mills | 30/90.8 |
| 5,093,992 | 3/1992 | Temple, Jr. et al. | 30/90.8 |
| 5,140,751 | 8/1992 | Faust | 30/90.1 |
| 5,443,536 | 8/1995 | Kiritsy et al. | 30/90.4 |

FOREIGN PATENT DOCUMENTS

| | | |
|---|---|---|
| 2493618 | 5/1982 | France. |
| 895442 | 5/1962 | United Kingdom. |

*Primary Examiner*—Akm E. Ullah
*Attorney, Agent, or Firm*—Ware, Fressola, Van Der Sluys & Adolphson

[57] ABSTRACT

A method and tool for accessing optical fibers contained in a buffer tube is provided. The buffer tube is held in a hourglass shaped bore formed by the mating engagement of first and second members. The mating engagement of the first second members also causes the engagement of cutting blades with the buffer tube. As the tool is drawn along the buffer tube, a chord of protective covering is removed from the buffer tube, providing access to the optical fibers held within.

20 Claims, 2 Drawing Sheets

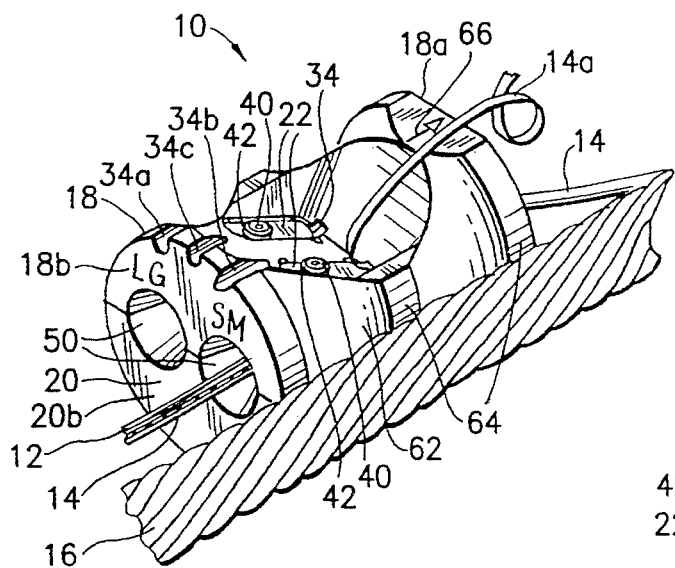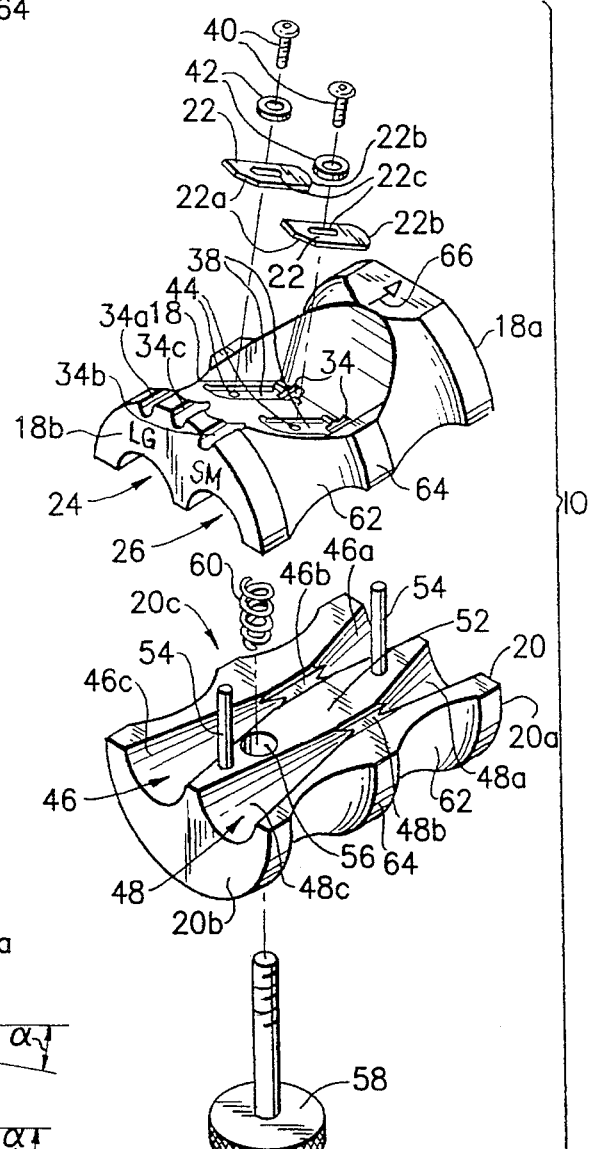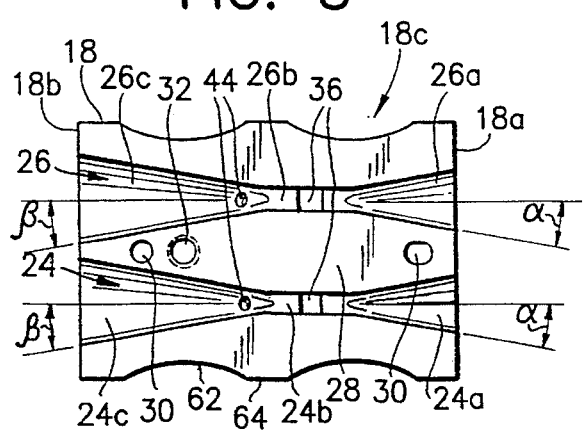

METHOD AND TOOL FOR ACCESSING OPTICAL FIBERS WITHIN A BUFFER TUBE

BACKGROUND OF THE INVENTION

1. Field of the Invention

The present invention relates generally to a method for accessing optical fibers within a buffer tube and, in particular, relates to a tool and method for accessing optical fibers within a buffer tube.

2. Description of the Prior Art

The use of protective buffer tubes for packaging optical fibers is well known in the telecommunications industry. Buffer tubes protect the optical fibers from stress induced attenuation and physical damage. Although many different optical fiber cable configurations are known and used in the telecommunications industry, one of the more popular designs includes grouping a series of buffer tubes around a central strength member with the entire assembly being encased in an outer protective sheath. The outer protective sheath may be made from a variety of materials including steel, plastic or other suitable material. The interior of the protective sheath around and between the buffer tubes can be filled with a water resistant, lubricating material, such as filling compound or other water blocking material. The optical fibers are typically loosely laid in the buffer tubes and the loose space within the tubes filled with a gel to provide lubrication, water resistance and minimize the stress placed on the fibers.

In some optical fiber configurations, the buffer tubes are helically wound around the central strength member. Often, the helical lay may be in one direction for the entire length of cable. Alternatively, a reverse oscillating lay configuration can be used in which the winding direction periodically alternates between a left and right lay. For example, Alcatel Telecommunication Cable Inc. sells a reverse oscillating lay configuration optical fiber cable under the name Non-Armored Loose Tube Yarn Reinforced Optical Fiber Cable.

As with conventional electrical conducting cable, splices to optical fiber cables are inevitable for connecting multiple cable lengths to construct a route, repairing a fiber breakage, re-routing service or adding an intermediary device. Often, this may involve accessing optical fibers contained in a single buffer tube while leaving the remaining buffer tubes intact. Accessing optical fibers contained within a single buffer tube without compromising the integrity of other buffer tubes in the cable can be difficult. For example, helical lay cables typically do not provide much slack in the buffer tubes. Consequently, it can be difficult to pull a single buffer tube away from the cable to access it.

A reverse oscillating lay cable configuration provides easier access to a single buffer tube in a midsection of a cable length once a section of the outer protective sheath has been removed to expose at least one change in winding direction. The oscillating lay provides slack to pull a single buffer tube away from the other buffer tubes in the cable. Once a single buffer tube has been pulled away from the cable, is easier to gain access to the optical fibers contained within.

Notwithstanding the obvious advantages that a reverse oscillating lay cable configuration offers over other configurations, it is not without its own problems. Although the alternating lay configuration provides more slack when the outer sheath is removed, the buffer tubes tend to retain their original shape, even when pulled away from the cable. The result of this "oscillation history" is that the buffer tube retains sharp bends, particularly at the point where the lay direction changes. A bent or curved shaped buffer tube can be more difficult to access, particularly with a conventional optical fiber access tool having a narrow aperture for receiving the buffer tube. The high resistance created by the bends can make it difficult to pull the tool along the buffer tube, resulting in binding and possibly buffer tube breakage.

For example, U.S. Pat. No. 5,093,992, issued to Temple et al. on Mar. 10, 1992, discloses a tube slitting tool having a radially mounted cutting blade for slitting a tube along its length. The narrow buffer tube channel makes it unsuitable for use with helically wound or bent buffer tubes. Moreover, the radial cutting blade of Temple et al. is hidden from view from the user, which may result in a more intrusive cut than necessary, possibly damaging the underlying optical fibers.

U.S. Pat. No. 4,972,581, issued to McCollum et al. on Nov. 27, 1990, discloses a fiber access tool having a cutting blade mounted transversely to a buffer tube for removing a chord of buffer tube. Unlike the Temple et al. blade, the transversely mounted cutting blade of McCollum et al. is less intrusive and less likely to damage the underlying optical fibers. However, the buffer tube channel of McCollum et al. is narrow and has a uniform cross-sectional area throughout. Consequently, the McCollum et al. tool would not work well with a helically wound or bent buffer tube because the buffer tube would offer too much resistance, possibly binding with or breaking the buffer tube.

Consequently, a tool which provides access to optical fibers contained in a helically wound or reverse oscillating lay buffer tube with low pulling resistance, minimal intrusion into the tube and in open view of the user is highly desirable.

SUMMARY OF THE INVENTION

The present invention is designed to overcome the limitations inherent in the methods and apparatus discussed above and toward this end it includes a novel method and tool for accessing optical fibers within a buffer tube.

An object of the present invention is to provide an optical fiber access tool which can access optical fibers contained in a buffer tube with low pulling resistance and minimal intrusion into the buffer tube.

Another object of the present invention is to provide an optical fiber access tool which has a preset cutting depth, performs the cutting in open view to the user and which does not have an exposed blade which may be a hazard to the user.

Yet another object of the present invention is to provide an optical fiber access tool which has at least one hourglass shaped bore for receiving the buffer tube so that a bent or curve shaped buffer tube is gradually straightened as it enters the tool, minimizing the amount of buffer tube in contact with the tool and the pulling resistance.

The foregoing objects are accomplished, at least in part, by utilizing a tool made in accordance with the present invention for accessing optical fibers contained in a buffer tube. The tool includes a first member, second member and two cutting blades. The first member has an inlet end, outlet end and at least one groove extending from the inlet end to the outlet end. The second member also has an inlet end, outlet end and at least one groove extending from the inlet end to the outlet end. The location and shape of the grooves on the first and second members are selected so that when the first and second members are mated, the grooves cooperate to form at least one hourglass shaped bore for receiving the buffer tube.

The cutting blades are mounted on the first member and protrude into the groove on the first member for removing a chord of the buffer tube as it is drawn through the tool.

The method of the present invention generally provides for separating the first and second members, positioning the buffer tube in one of the grooves on the first or second member, joining the first and second members so that the buffer tube is held in one of the hourglass shaped bores in contact with one of the cutting blades and sliding the tool along the buffer tube to remove a chord of the buffer tube.

The present invention offers several advantages over the prior art. First, the present invention provides access to optical fibers contained in a buffer tube with minimal intrusion into the buffer tube. In addition, the present invention has a preset cutting depth, performs the cutting in open view to the user and does not have an exposed blade which may be a hazard to the user. Most importantly, the tool provides at least one hourglass shaped bore for receiving the buffer tube so that a bent or curve shaped buffer tube is gradually straightened as it enters the tool, minimizing the amount of buffer tube in contact with the tool, thus minimizing the pulling resistance.

Other objects and advantages will become apparent to those skilled in the art from the following detailed description read in conjunction with the appended claims and drawings attached hereto.

BRIEF DESCRIPTION OF THE DRAWINGS

The drawings, not drawn to scale, include:

FIG. 1 which is a perspective view of a tool for accessing optical fibers within a buffer tube embodying the principles of and being employed in the method of the present invention;

FIG. 2 which is an exploded perspective view of the tool of FIG. 1;

FIG. 3 which is a bottom plan view of the first member of the tool according to the present invention;

DETAILED DESCRIPTION OF THE INVENTION

Figure 4:
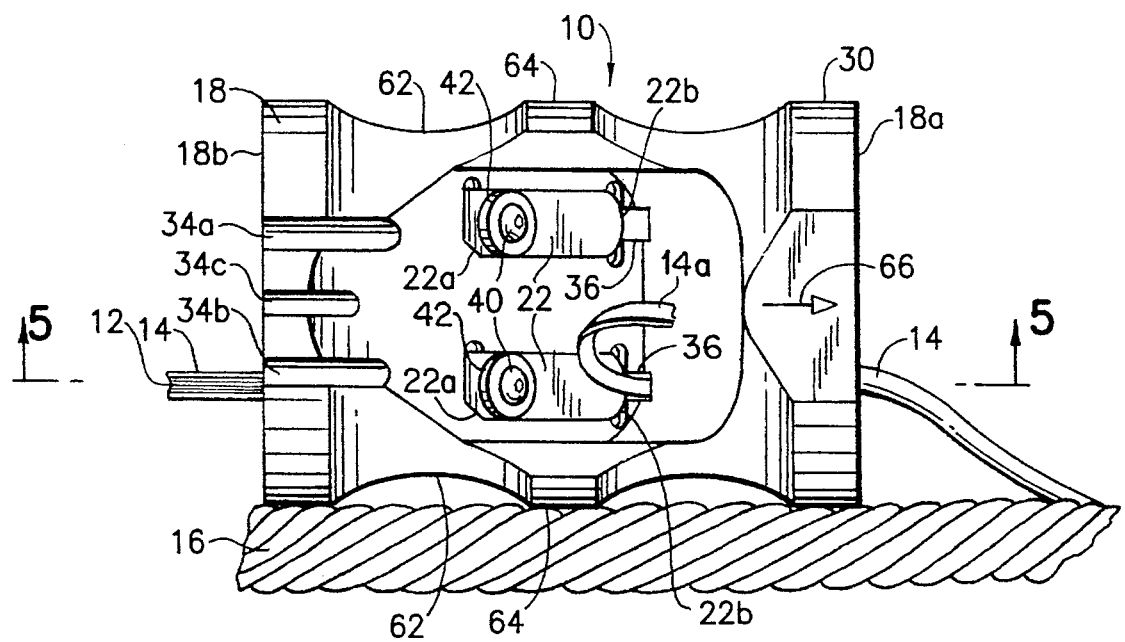
FIG. 4 which is a top plan view showing a tool according to the present invention being used to access optical fibers within a buffer tube in accordance with the method of the present invention.

Referring first to FIG. 1, therein illustrated is a hand-held tool of the present invention, generally indicated by the numeral 10, accessing optical fibers 12 contained in a buffer tube 14 from a plurality of buffer tubes 16 in a helical or reverse oscillating helical lay. The tool 10 includes a first member 18, second member 20 and two cutting blades 22.

Figure 5:
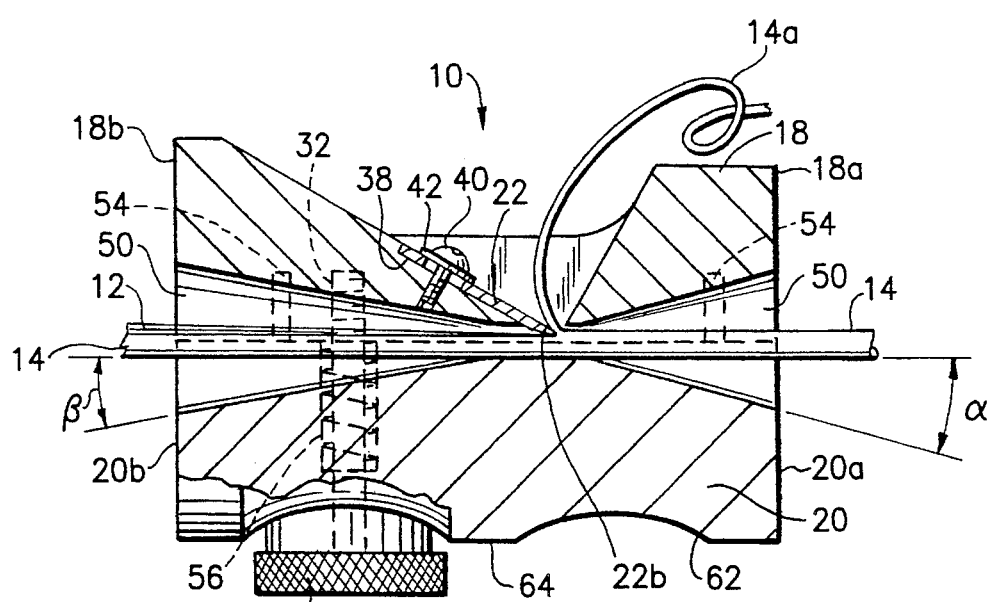
FIG. 5 which is a cross sectional view taken along line 5—5 of FIG. 4.

As illustrated in FIGS. 2 and 3, the first member 18 is generally semi-circular in cross-section and has an inlet end 18a, an outlet end 18b and a lower flat face 18c (FIG. 3). The lower flat face 18c has two parallel grooves shown generally as numerals 24 and 26 defined therein, which extend from the inlet end 18a to the outlet end 18b and have inlet sections 24a, 26a, middle sections 24b, 26b and outlet sections 24c, 26c. The only difference between the grooves 24, 26 is that the middle sections 24b, 26b are dimensionally sized to accommodate buffer tubes of different sizes. The inlet sections 24a, 26a are semi-conical in shape and taper inward towards the middle of the first member 18, their widest points being at the inlet end 18a. As shown in FIGS. 3 and 5, the inlet sections 24a, 26a have a half cone angle of $\alpha$, which is in the range of approximately 15 to 20 degrees, the preferred angle $\alpha$ being 20 degrees. The inlet sections 24a, 26a join the middle sections 24b, 26b at their narrowest points, near the middle of the first member 18, slightly closer to the inlet end 18a. Conveniently, the middle sections 24b, 26b are rectangular in shape and are dimensionally sized to position the buffer tube 14 in contact with the cutting blades 22. Tapering outwardly from their narrowest point at the middle sections 24b, 26b toward the outlet end 18b are the outlet sections 24c, 26c which are also semi-conical in shape. The outlet sections 24c, 26c have a similar taper to the inlet sections 24a, 26a, but are longer, resulting in a wider flare at the outlet end 18b. As shown in FIGS. 3 and 5, the outlet sections 24c, 26c have a half cone angle of $\beta$, which is in the range of approximately 15 to 20 degrees, the preferred angle $\beta$ being 20 degrees. As would be appreciated by one skilled in the art, the half cone angle $\alpha$ is more important than the half cone angle $\beta$ because the buffer tube 14 has usually been straightened after passing through the middle sections 24b, 26b and is less likely to jam in the outlet sections 24c, 26c. The lower flat surface 18c also has a central land area 28 located between the parallel grooves 24 and 26. Provided on the central land area 28 are guide holes 30 and a threaded bushing 32 for assisting in the alignment between the first member 18 and the second member 20, as will be explained further hereinafter.

Finally, as shown in FIGS. 1, 2 and 4, the first member 18 conveniently includes a large sizing slot 34a, a small sizing slot 34b and a minimum sizing slot 34c, which allow a user to measure the buffer tube 14 and determine if either of the parallel grooves 46, 48 can be used. The large sizing slot 34a is dimensionally sized to accept the largest size buffer tube 14 which can be used in parallel groove 46. On the other hand, small sizing slot 34b is dimensionally sized to accept the largest size buffer tube 14 which can be used in parallel groove 48, while the minimum sizing slot 34c is dimensionally sized to accept the smallest size buffer tube 14 which can be used in parallel groove 48.

Referring now to FIGS. 3 and 4, the first member 18 also includes rectangular-shaped through blade apertures 36, located in the middle sections 24b, 26b of the parallel grooves 24 and 26, through which the cutting blades 22 protrude to make contact with the buffer tube 14.

In FIGS. 1, 2, 4 and 5, the two cutting blades 22 are mounted in cutting blade recesses 38 in the first member 18. The blade recesses 38 are included in the first member 18 for providing a single mounting position and orientation for the cutting blades 22. The shape of the blade recesses 38 is selected to closely match the shape of the cutting blades 22, including a chamfer 22a on the cutting blades 22. The chamfer 22a prevents the cutting blades 22 from being mounted backwards or upside down. Each blade 22 is of generally rectangular shape with a narrow side forming a cutting edge 22b. The cutting edges 22b of the cutting blades 22 engaging the buffer tube 14 are substantially semi-circular shaped to most effectively remove a chord of the buffer tube 14a.

As shown in FIG. 2, a longitudinal slot 22c is also provided in each cutting blade 22. Each blade 22 is fastened to the first member by the insertion of a screw 40 through a washer 42, through the longitudinal slot 22c and into a threaded aperture 44 (FIGS. 2 and 3). The cutting edges 22b of blades 16 extend through blade aperture 36 and define a horizontal chord across at least a portion of the middle sections 24b, 26b.

Removably mounted to the first member 18 is the second member 20 which is also generally semi-circular in cross-section and has an inlet end 20a, outlet end 20b and an upper flat face 20c (FIG. 2). The upper flat face 20c has two parallel grooves, shown generally as numerals 46, 48 in FIG. 2, which are virtually identical to the two parallel grooves 24, 26 on the first member 18. Each of the parallel grooves 46, 48 extends from the inlet end 20a to the outlet end 20b and has inlet sections 46a, 48a, middle sections 46b, 48b and outlet sections 46c, 48c which are virtually identical to the inlet sections 24a, 26a, middle sections 24b, 26b and outlet sections 24c, 26c of the parallel grooves 24, 26 on the first member 18.

The grooves 24, 26 and 46, 48 are located and shaped so that when the first member 18 and second member 20 are assembled together, the grooves 24, 26 and 46, 48 form two hourglass shaped through bores 50 (as best seen in FIGS. 1 and 5), in one of which the buffer tube 14 is held in performing the method of the present invention. The middle sections 24b, 26b and 46b, 48b are dimensioned so that one of the hourglass shaped bores 50 will accept buffer tubes with outside diameters of between 2.5 mm and 2.7 mm while the other hourglass shaped bore 50 will accept buffer tubes with outside diameters of between 2.9 mm and 3.2 mm. As would be understood by one skilled in the art, the sizes of the parallel grooves 24, 26 could be selected to accommodate larger or smaller buffer tubes without departing from the scope of the invention. As would be appreciated by one skilled in the art, the rectangular shape of the middle sections 24b, 26b and 46b, 48b is advantageous because this shape reduces the contact area between the buffer tube 14 hourglass shaped bores 50, thus minimizing the friction therebetween.

As shown in FIG. 2, the upper flat face 20c of the second member 20 has a central land area 52, disposed between the parallel grooves 46, 48. Extending from the central land area 52 are two guide posts 54 which are positioned on the second member 20 and are dimensionally sized to slide into the guide holes 30 in the first member 18, whereby substantial alignment between the parallel grooves 24, 26 of the first member 18 and the parallel grooves 46, 48 of the second member 20 is achieved to define the two hourglass-shaped through bores 50.

The central land area 52 of the second member 20 has a pilot hole 56 to receive a thumbscrew 58 which extends through the second member 20 and into the threaded aperture 44 to releasably join the first member 18 and the second member 20. The pilot hole 56 in the second member 20 is countersunk to seat a spring 60 allowing the first member 18 and the second member 20 to be completely engaged without interference from the spring 60. When the first member 18 and the second member 20 are separated, the spring 60 is held in the countersunk pilot hole 56 in the second member 20. The spring 60 biases the first member 18 and second member 20 apart when the thumbscrew 58 is loosened.

It should be understood that the peripheral surfaces of the first member 18 and the second member 20 are shaped to form a barrel shaped tool having peripheral grooves 62 and peripheral ridges 64 to make the tool easier to grip. The tool can be of various sizes, shapes and designs in order to provide a good grip which can be especially important when the tool is used with buffer tubes made from harder materials, requiring a greater force to remove a chord of buffer tube material.

It will be appreciated by one skilled in the art that both the first member 18 and second member 20 may be made from a large variety of materials including, for example, aluminum, brass or other alloy, plastic, carbon fibers or other composite material, as long as the parallel grooves 24, 26 and 46, 48 are formed with a smooth finish to allow the buffer tube 14 to slide easily through the hourglass shaped through bores 50.

Once the cutting blades 22 have been mounted in the cutting blade recesses 38, the tool 10 is ready to be used. First, the outer sheath of the cable (not shown) is opened to expose the plurality of buffer tubes 16. The single buffer tube 14 to be accessed is unwound from the cable and measured in the large sizing slot 34a, small sizing slot 34b and minimal sizing slot 34c to determine if the tool 10 can be used, and if so, which of the hourglass shaped through bores 50 can be used. Upon loosening the thumbscrew 58, the first member 18 and the second member 20 are at least partially separated under the biasing action of the spring 60. The buffer tube 14 is then aligned with and placed into one of the parallel grooves 46, 48 of the second member 20. Tightening the thumbscrew 58, draws the first member 18 and the second member 20 together, causing the cutting blades 22 to pierce the buffer tube 14 to the pre-defined depth. The tool 10 is then drawn along the buffer tube 14 in the direction of an arrow 66 (FIGS. 1, 2 and 4) to remove a chord 14a of buffer tube 14, which is discharged out the top of the tool 10 thereby exposing the optical fibers 12 contained within. The hourglass shaped through bores 50 allow the buffer tube 14 to easily slide through the tool 10. Any bends in the buffer tube 14 are easily accommodated by the gradual tapered shape of the bores 50, without the buffer tube 14 binding or jamming in the tool 10. After the desired amount of the buffer tube 14 has been removed, the thumbscrew 58 is loosened and the first member 18 separated from the second member 20 to free the buffer tube 14.

As will be appreciated from the description provided herein, the present invention provides an effective method and tool for accessing optical fibers within a buffer tube. Although the present invention has been described and discussed herein with respect to at least one embodiments, other arrangements or configurations may also be used that do not depart from the spirit and scope hereof. Hence, the present invention is deemed limited only by the appended claims and the reasonable interpretation thereof.

What is claimed is:

1. A tool for accessing optical fibers within a buffer tube comprising:

a first member having an inlet end, an outlet end and at least one groove extending from said inlet end to said outlet end;

a second member releasably mounted on said first member, said second member having an inlet end, an outlet end and at least one groove extending from said inlet end to said outlet end, said at least one groove of said second member being substantially aligned to cooperate with said at least one groove of said first member to form at least one substantially hourglass shaped through bore for slidably receiving the buffer tube;

at least one cutting blade mounted in said first member and protruding into said at least one groove in said first member for removing a chord of the buffer tube; and alignment means disposed on said first member and said second member for aligning and joining said first member with said second member.

2. The tool for accessing optical fibers within a buffer tube in accordance with claim 1, wherein each said at least one groove on said first and second members includes an inlet section, a middle section and an outlet section, said inlet sections being semi-conical in shape, the cross-sectional area of said inlet sections increasing from said middle section to said inlet end, a widest part of said inlet sections being located at said inlet end of said first and second members, said middle sections being located between said inlet sections and said outlet sections and being generally rectangular in shape for positioning the buffer tube in contact with said at least one cutting blade, said outlet sections being semi-conical in shape, the cross-sectional area of said outlet sections increasing from said middle sections to said outlet end, a widest part of said outlet sections being located at said outlet end of said first and second members.

3. The tool for accessing optical fibers within a buffer tube in accordance with claim 2, wherein said inlet sections are formed having a half cone angle of $\alpha$, wherein $\alpha$ is in the range of approximately 15 to 20 degrees.

4. The tool for accessing optical fibers within a buffer tube in accordance with claim 3, wherein $\alpha$ is 20 degrees.

5. The tool for accessing optical fibers within a buffer tube in accordance with claim 2, wherein said inlet sections are formed having a half cone angle of $\alpha$ and wherein said outlet sections are formed having a half cone angle of $\beta$, wherein $\alpha$ and $\beta$ are in the range of approximately 15 to 20 degrees.

6. The tool for accessing optical fibers within a buffer tube in accordance with claim 2, wherein the number of at least one groove on said first and second members is two and wherein the grooves on said first and second members are dimensioned to form a first hourglass shaped bore for receiving a buffer tube having an outer diameter of between 2.5 mm and 2.7 mm, and a second hourglass shaped bore for receiving a buffer tube having an outer diameter of between 2.9 mm and 3.2 mm.

7. The tool for accessing optical fibers within a buffer tube in accordance with claim 2, wherein said alignment means further comprises at least one guide post disposed on said second member and at least one guide hole in said first member, said at least one guide hole being positioned and dimensionally sized to receive said at least one guide post.

8. The tool for accessing optical fibers within a buffer tube in accordance with claim 2, wherein said alignment means further comprises a thumb screw and a spring for selectively engaging and disengaging said first and second members, said spring being disposed between said first and second members and said thumbscrew being disposed in a pilot hole in said second member and threaded into a threaded aperture in said first member.

9. The tool for accessing optical fibers within a buffer tube in accordance with claim 7, wherein said alignment means further comprises a thumb screw and a spring for selectively engaging and disengaging said first and second members, said spring being disposed between said first and second members and said thumbscrew being disposed in a pilot hole in said second member and threaded into a threaded aperture in said first member.

10. The tool for accessing optical fibers within a buffer tube in accordance with claim 9, wherein the ends of said at least one cutting blade in contact with the buffer tube are round in shape.

11. The tool for accessing optical fibers within a buffer tube in accordance with claim 9, wherein said inlet sections are formed with a half cone angle of $\alpha$, wherein $\alpha$ is in the range of approximately 15 to 20 degrees.

12. The tool for accessing optical fibers within a buffer tube in accordance with claim 11, wherein $\alpha$ is 20 degrees.

13. The tool for accessing optical fibers within a buffer tube in accordance with claim 9, wherein said inlet sections are formed having a half cone angle of $\alpha$ and wherein said outlet sections are formed having a half cone angle of $\beta$, wherein $\alpha$ and $\beta$ are in the range of approximately 15 to 20 degrees.

14. The tool for accessing optical fibers within a buffer tube in accordance with claim 9, wherein the number of at least one groove on said first and second members is 2 and wherein the grooves on said first and second members are dimensioned to form a first hourglass shaped bore for receiving a buffer tube having an outer diameter of between 2.5 mm and 2.7 mm and a second hourglass shaped bore for receiving a buffer tube having an outer diameter of between 2.9 mm and 3.2 min.

15. A method for accessing optical fibers contained in a buffer tube comprising the steps of:
 (a) providing a tool for accessing optical fibers within a buffer tube comprising:
  (i) a first member having an inlet end, an outlet end and at least one groove extending from said inlet end to said outlet end,
  (ii) a second member, mounted on said first member, said second member having an inlet end, an outlet end and at least one groove extending from said inlet end to said outlet end and being substantially aligned to cooperate with said at least one groove of said first member to form at least one hourglass shaped through bore for slidably receiving the buffer tube,
  (iii) at least one cutting blade mounted in said first member and protruding into said at least one groove in said first member for removing a chord of the buffer tube, and
  (iv) alignment means disposed on said first member and said second member for aligning and joining said first member with said second member;
 (b) separating said first and second members;
 (c) aligning the buffer tube with one of said at least one groove of said second member;
 (d) joining said first and second members so that the buffer tube is held in one of said at least one hourglass shaped through bores formed by a mating engagement of said first and second members; and
 (e) initiating relative movement between said tool and the buffer tube to remove a chord of the buffer tube thereby providing access to the optical fibers contained therein.

16. The method for accessing optical fibers contained in a buffer tube according to claim 15, wherein said alignment means includes at least one guide post and a thumbscrew and wherein said step of separating said first and second members includes the step of loosening said thumbscrew to separate said first and second members.

17. The method for accessing optical fibers contained in a buffer tube according to claim 16, wherein said first member includes at least one guide hole for receiving said at least one guide post and wherein the step of joining said first and second members further includes the step of aligning each of said at least one guide post with the corresponding at least one guide hole.

18. The method for accessing optical fibers contained in a buffer tube according to claim 17, wherein the step of joining said first and second members further includes the step of tightening said thumbscrew so that said at least one cutting blade is positioned in cutting engagement with the buffer tube.

19. The method for accessing optical fibers contained in a buffer tube according to claim 15, wherein said inlet sections are formed having a cone angle of $\alpha$, wherein $\alpha$ is in the range of approximately 15 to 20 degrees.

20. The method for accessing optical fibers contained in a buffer tube according to claim 19, wherein $\alpha$ is 20 degrees.

* * * * *

UNITED STATES PATENT AND TRADEMARK OFFICE
CERTIFICATE OF CORRECTION

PATENT NO. : 5,577,150
DATED : November 19, 1996
INVENTOR(S) : James D. Holder and Jeffrey S. Barker It is certified that error appears in the above-indentified patent and that said Letters Patent is hereby corrected as shown below:

Column 8, line 10, (claim 14) reads "3.2 min." --should read 3.2 mm.--

Signed and Sealed this

Eleventh Day of February, 1997

*Attest:*

BRUCE LEHMAN

*Attesting Officer*　　　　*Commissioner of Patents and Trademarks*